US008296283B2

(12) United States Patent
Agapiev et al.

(10) Patent No.: US 8,296,283 B2
(45) Date of Patent: Oct. 23, 2012

(54) DHT-BASED DISTRIBUTED FILE SYSTEM FOR SIMULTANEOUS USE BY MILLIONS OF FREQUENTLY DISCONNECTED, WORLD-WIDE USERS

(75) Inventors: Borislav Agapiev, Portland, OR (US); Igor Kabiljo, Beograd (RS)

(73) Assignee: Google Inc., Mountain View, CA (US)

( * ) Notice: Subject to any disclaimer, the term of this patent is extended or adjusted under 35 U.S.C. 154(b) by 56 days.

(21) Appl. No.: 12/758,417

(22) Filed: Apr. 12, 2010

(65) Prior Publication Data

US 2011/0106758 A1 May 5, 2011

Related U.S. Application Data

(63) Continuation of application No. 12/608,932, filed on Oct. 29, 2009, now Pat. No. 7,716,179.

(51) Int. Cl.
*G06F 7/00* (2006.01)
(52) U.S. Cl. ........ 707/707; 707/706; 707/722; 707/736; 707/713; 707/758; 707/781; 707/640; 707/610; 707/674; 370/328; 370/395.3; 370/395.72; 370/255; 370/252; 709/238
(58) Field of Classification Search ............... 707/706, 707/707, 722, 736, 713, 758, 781, 640, 610, 707/674, 999.002, 999.003; 370/395.3, 395.72, 370/255, 252; 709/238
See application file for complete search history.

(56) References Cited

U.S. PATENT DOCUMENTS

| | | | |
|---|---|---|---|
| 7,418,454 B2 | 8/2008 | Chen et al. | |
| 7,447,684 B2 | 11/2008 | Bates | |
| 7,536,470 B2 | 5/2009 | Li et al. | |
| 7,587,426 B2 | 9/2009 | Fujiwara et al. | |
| 7,716,179 B1 | 5/2010 | Agapiev et al. | |
| 2002/0129014 A1* | 9/2002 | Kim et al. ..................... | 707/5 |
| 2004/0267809 A1 | 12/2004 | East et al. | |
| 2005/0198286 A1 | 9/2005 | Xu et al. | |
| 2006/0224775 A1 | 10/2006 | Lee et al. | |

(Continued)

FOREIGN PATENT DOCUMENTS

WO 2009031156 A2 3/2009

OTHER PUBLICATIONS

Author: Kaashoek et al Title: A imple degree-optimal distributed hash table Date: 2003 Publisher: IRIS project http://project-iris.net Pertinent pp. 6.*

(Continued)

*Primary Examiner* — Syling Yen
(74) *Attorney, Agent, or Firm* — Harrity & Harrity, LLP

(57) ABSTRACT

Content items in a distributed system are defined by a respective key, and each such content item is copied to R1 computer systems of the distributed system which have unique identifiers closest to a value of the respective key, where R1 is less than R2 which is less than R3, at least R2 number of the computer systems have copies of any respective one of the content items for all of the content items, and none of the computer systems farther than R3 in an address space of the distributed system have a copy of the subject content item. Modifications of individual content items are synchronized across all instances thereof responsive to a put operation and/or at periodic intervals.

20 Claims, 2 Drawing Sheets

U.S. PATENT DOCUMENTS

| | | | |
|---|---|---|---|
| 2006/0262726 | A1 | 11/2006 | Lieuallen |
| 2007/0133554 | A1 | 6/2007 | Ederer et al. |
| 2007/0162462 | A1 | 7/2007 | Zhang et al. |
| 2008/0005188 | A1 | 1/2008 | Li et al. |
| 2008/0130516 | A1 | 6/2008 | You et al. |
| 2008/0181135 | A1 | 7/2008 | Yalagandula |
| 2008/0201335 | A1 | 8/2008 | Dubnicki et al. |
| 2008/0201428 | A1 | 8/2008 | Dubnicki et al. |
| 2008/0208996 | A1 | 8/2008 | Thompson |
| 2008/0225780 | A1* | 9/2008 | McCormick et al. ......... 370/328 |
| 2009/0125637 | A1 | 5/2009 | Matuszewski |

OTHER PUBLICATIONS

Zhu, Y. Hu, Y., Efficient, proximity-aware load balancing for DHT-based P2P systems, IEEE Transactions on Parallel and Distributed Systems, issue 4, pp. 349-361, Apr. 2005.

Ribeiro, H.B. et al., Implementing a Peer-to-Peer Web Browser for Publishing and Searching Web Pages on Internet, 21st International Conference on Advanced Information Networking and Applications, 2007. AINA '07., pp. 754-761, May 21-23, 2007, Niagra Falls, ON, Canada.

Wenhui Ma et al., Scalable keyword search based on semantic in DHT based peer-to-peer system, Proceedings of the 2nd international conference on Scalable information systems, Suzhou, China, ACM International Conference Proceeding Series; vol. 304 archive,article No. 304, 2007.

Sylvia Ratnasamy et al., A scalable content-addressable network, ACM SIGCOMM Computer Communication Review, vol. 31, issue 4 (Oct. 2001), pp. 161-172, 2001.

Antony Rowstron & Peter Druschel, Pastry: Scalable, Decentralized Object Location, and Routing for Large-Scale Peer-to-Peer Systems, Lecture Notes in Computer Science, vol. 2218, Proceedings of the IFIP/ACM International Conference on Distributed Systems Platforms, Heidelberg, pp. 329-350, 2001.

Ion Stoica et al., Chord: A Scalable Peer-to-Peer Lookup Service for Internet Applications, Proceedings of the 2001 Conference on Applications, Technologies, Architectures, and Protocols for Computer Communications (San Diego, California) SIGCOMM '01, pp. 149-160, ACM, New York, NY, 2001.

M. Frans Kaashoek and David R. Karger, Koorde: A simple degree-optimal distributed hash table; IRIS Project; http://project-iris.net; 2003, 6pp.

WOWD, Inc.; International Application No. PCT/US2010/030774 filed Apr. 12, 2010; International Search Report and Written Opinion; Nov. 19, 2010; ISA/KR; 9pp.

* cited by examiner

DHT-BASED DISTRIBUTED FILE SYSTEM FOR SIMULTANEOUS USE BY MILLIONS OF FREQUENTLY DISCONNECTED, WORLD-WIDE USERS

RELATED APPLICATIONS

This is a CONTINUATION of U.S. patent application Ser. No. 12/608,932, filed Oct. 29, 2009, now U.S. Pat. No. 7,716,179, which is incorporated herein by reference.

FIELD OF THE INVENTION

The present invention generally relates to the field of distributed file systems and, more particularly, to such file systems that are based on distributed hash tables.

BACKGROUND

File systems are well-known means for storing and organizing computer files and the data they contain. Distributed file systems provide means for storing and organizing information on multiple computer systems which are connected with one another through a network. An important characteristic of a distributed file system is that it presents a unified view to data and files stored therein, such that all of the data can be accessed without regard to which particular computer system, or plurality of computer systems, in the network the data is actually stored on.

Another type of distributed system is a content delivery network (CDN). Unlike file systems, which are intended to permit reading and writing of data, CDNs are intended as distributed systems for the rapid delivery of immutable content (usually via the Internet), such as audio-video content. This is accomplished by strategically placing copies of the content on computer systems which are located close (logically and/or physically) to users of the content and which are therefore able to quickly deliver the content to the users. An important characteristic of a CDN is that it is read-only: once content is placed in a CDN, the content cannot be changed—i.e., only reads by users are accelerated and there are no writes. If there is even a minute change to the content, the entire copy of the revised content must be republished in the CDN by storing a fresh copy and redistributing it throughout the network.

BitTorrent is a very popular CDN algorithm for distribution of content on peer-to-peer (P2P) networks. We consider BitTorrent as a CDN algorithm as there are no means of modifying content that is distributed in the system. In the BitTorrent algorithm content is divided into chunks and different computers (nodes) on the network download chunks separately. Upon downloading a chunk, each node becomes a peer—a node capable of serving the chunk to another node. Nodes that have all chunks for a given content are called seeds. There are also tracker nodes that keep track of peers and seeds for a given content item.

Because nodes can join and leave the network arbitrarily, the distribution of chunks available at any given moment varies. Chunks for popular content will generally be readily available on the network, as there will be many nodes that have downloaded such chunks (the number of such downloads is indicative of the relative popularity of the chunks). This organic nature in the increase in availability of popular content gives BitTorrent very important read scalability where the more reads (requests for download) there are, there will be more servers (nodes that have completed downloads) to fulfill the read requests. In other words, the system is capable of naturally balancing and increasing serving capacity with increases in popularity and number of reads, in stark contrast to conventional centralized client-server systems where an increase in read loads placed on a single, or a fixed plurality of servers, will slow the system down.

As noted above, however, CDNs like BitTorrent are useful only when dealing with immutable content. In situations where both reads and writes can be expected from multiple, distributed nodes, other forms of distributed networks are required.

SUMMARY OF THE INVENTION

In one embodiment of the invention, a distributed system includes a plurality of computer systems communicatively coupled to one another via one or more networks. Each of the computer systems includes a computer-readable storage device, and collectively these computer-readable storage devices store content items. Each content item is stored at a location in an address space of the distributed network defined by a key of a distributed hash table, and at redundant ones of the computer systems defined by three redundancy factors: R1 which is less than R2 which is less than R3, where R1 number of the computer systems of the distributed system with unique identifiers closest to a respective key of a subject content item have a redundant copy of the subject content item, at least R2 number of the computer systems have copies of any respective one of the content items for all of the content items, and none of the computer systems farther than R3 in the address space of the distributed system have a copy of the subject content item. Note that in an alternative embodiment of the present invention, instead of R1<R2<R3, the three constants may be equal, i.e., R1=R2=R3, in which case the number of replicated copies is fixed.

A further embodiment of the present invention provides for storing content items in a distributed system by writing each content item to a storage device of a computer system of the distributed system defined by a respective key, and copying each such content item to a further R1 computer systems of the distributed system which have unique identifiers closest to a value of the respective key, where R1 is less than R2 which is less than R3, where at least R2 number of the computer systems have copies of any respective one of the content items for all of the content items, and none of the computer systems farther than R3 in an address space of the distributed system have a copy of the subject content item. Modifications of an individual one of the content items can be synchronized across all instances of the individual content item stored on the storage devices of the computer systems which comprise the distributed system responsive to a put operation to store a modified version of the individual content item and/or at periodic intervals. Synchronization of differences of replicas on multiple ones of the computer systems is performed by exchanging messages. When sending messages about copies each computer system stores, it is not necessary to send the entire copy but only a hash, or a sequence of hashes of pieces of content, preferably pieces of size $\frac{1}{2}^N$ for some integer N. The hashes indicate differences only in sub-pieces of the copy so only those sub-pieces need to be exchanged and not the entire copy.

Still another embodiment of the present invention provides for the creation of an Internet search index by analyzing, at a first of a plurality of computer systems which are organized as a distributed system, pages stored in a local Web cache; producing, for each such analyzed page, a set of terms appearing in the analyzed page; for each occurrence k of a term in each Web page p that has been analyzed, creating an index entry IDX(k,p), and issuing a put operation into a distributed hash table distributed file system comprised of the plurality of computer systems in the distributed system, said put operation having as a key a hash value computed for term k, and having as a value an index entry for page p in a termlist for term k, the index entry including information to be displayed in response to Internet search queries. The value of the index entry may include one or more of: a uniform resource locator (URL) for page p; text of a link for page p; a string created by extraction of some or all of the text of the page, and a graphical image of the page p or an image contained within page p considered to be a good graphical representation of the page p.

These and further embodiments and features of the present invention are discussed below.

BRIEF DESCRIPTION OF THE DRAWINGS

The present invention is illustrated by way of example, and not limitation, in the figures of the accompanying drawings, in which.

DETAILED DESCRIPTION

Described herein is a distributed hash table-based distributed file system (DHTFS). In contrast to a CDN, data can be written to and modified in a DHTFS. The present invention finds particular advantage in distributed applications, for example Internet search. Before discussing such applications, however, consider the distributed hash table (DHT) which underlies the DHTFS.

A hash function (or hash table) is a function that uniformly and, often uniquely, maps strings to a range of numbers. The number to which a hash function maps a given string is called the key for that string. A DHT then is a means for partitioning the space of all possible keys among a set of computers connected through a network.

Figure 1:
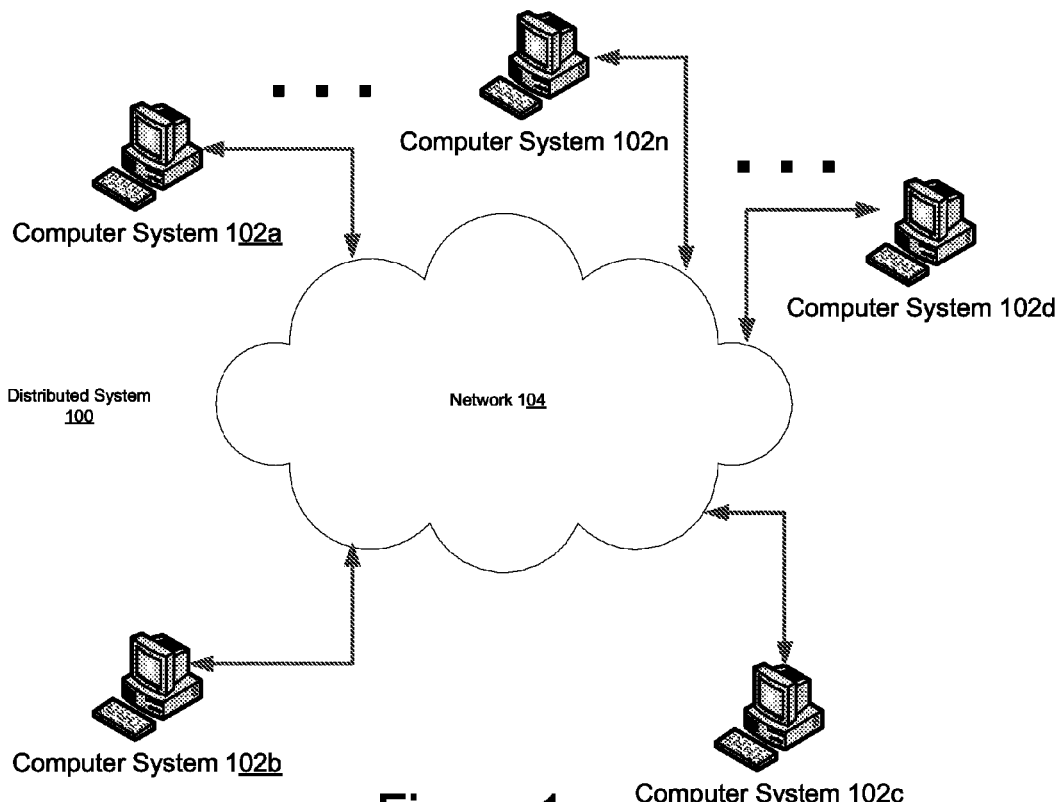
FIG. 1 illustrates an example of a distributed system within which embodiments of the present invention may be implemented.

The computers associated with the DHT keys are arranged in a network, called an overlay network. FIG. 1 illustrates an example of a distributed system 100 which includes multiple individual computer systems 102a-102n, communicatively coupled with one another via one or more networks 104. In accordance with the present invention, computer systems 102a-102n form an overlay network for the present DHTFS. Notice that none of the individual computer systems 102a-102n is indicated as a controller. This is the nature of a distributed system, where the operations for storing, modifying and synchronizing content consistent with the present invention are provided at each node of the network.

Network 104 may, in one implementation, be the Internet, but could also be or include one or more local or wide area network within one or more enterprises. Each instance of a computer system 102a-102n may be configured to perform the data storage and synchronization processes discussed herein, for example through the use of appropriately coded computer-readable instructions stored on computer-readable media and executed by computer processors associated with each computer system. These computer-readable instructions, when being executed, adapt the general purpose computer system to the specific functionalities discussed herein. Moreover, each of these computer systems includes a storage device and the DHTFS stores content across the address space defined by these storage devices using the DHT keys as partitions for that address space.

In accordance with the present invention, a DHT overlaid across distributed system 100 provides the structure for a distributed file system. That is, the file system used by distributed system 100 relies on the mappings provided by the DHT to partition the storage of content items within the distributed system so that content items are stored at individual ones of computer systems 102a-102n, but are accessible to all such computer systems. The storage and retrieval of content items are facilitated through two principal kinds of messages in a DHT:

put(key,value)
get(key)

The DHT put message is used for storing an arbitrary sequence of bytes value under the key. The DHT get message returns the last value stored in the DHT under a given key.

Content items are organized and stored within distributed system 100 at locations identified by the DHT, which locations are distributed across the plurality of computers 102a-102n. In practice, the number of individual computer systems that make up distributed system 100 may be very large and the individual computer systems may be interconnected across vast physical and/or logical distances through multiple network equipments (such as routers, switches, etc.). To be useful, the present DHTFS provides strict guarantees of latencies for read and write accesses by having limits on number of accesses. The limits are bound by $\log_M N$, where N is the number of nodes in the network (i.e., the number of individual computer systems over which content is distributed), and M is a constant. M could be 2, in a binary organization, but it is desirable to have M>2 to reduce number of routing hops. Larger M are obtained by increasing the size of the routing table (which is stored at each node of the distributed system) and the number of nodes contacted in every routing step.

The DHT algorithm automatically routes messages (i.e., stores content) to the particular computer in the overlay network responsible for a set of keys to which a given key belongs. There are several choices for routing algorithms in a DHT, but one of the principal requirements for a DHT routing algorithm is that it has a log(N) network diameter, meaning that the worst case delay in routing a message to a node in the DHT is a logarithmic function of the number of nodes N in the network. Each node has a permanent binary identification (ID) assigned to it, within range 0≦ID<S, where S is the size of the key space.

In one embodiment of the present invention, a DHT routing algorithm called Kademlia is used. This algorithm is described in Petar Maymounkov and David Mazières, *Kademlia: A Peer-to-peer information System Based on the XOR Metric*, presented at the $1^{st}$ International Workshop on Peer-to-peer Systems 2002. In the Kademlia algorithm, DHT nodes are organized in a binary tree and each node has a routing table of size k*log(S), where S is a power of two representing the number of all possible different keys in the DHT. In Kademlia, the routing table for each node is organized into buckets, where each bucket represents contact information for nodes in progressively larger complete binary sub-trees adjacent to the node in question. For instance, the first bucket contains, at most, one node that is the immediate neighbor of the node in question and whose ID differs from the current node ID in a single bit. The next bucket contains nodes from three possible nodes in a sub-tree rooted by a node two levels up the tree, and so on.

In order to improve reliability and robustness, instead of a single contact for each sub-tree, there are k nodes, where k is a constant, redundant factor. In the original design of Kademlia, k is a constant. The present invention, however, provides a scheme where k is not a constant and is progressively larger for buckets farther away from the subject node. This optimization reduces routing time by reducing, on average, the number of hops required for routing a message.

In the present DHTFS, nodes can be frequently disconnected in an arbitrary fashion. For example, users may turn off their computers located anywhere, at any time. Therefore, in order to support consistency and availability of data, all data in the DHTFS is replicated across multiple nodes (i.e., multiple ones of computer systems $102a$-$102n$). Upon a write, the subject data is written to a plurality of R computer systems (or, more generally, R storage locations associated with individual computer systems), where R is a redundancy factor. More particularly, in the present DHTFS, each piece of data, represented as sequence of bytes, is written under a key, with a put operation to R computers with IDs currently closest to the value of the key. Here, closest means that the absolute value of the difference between the binary IDs of the computer system identified by the key and the computer system under test (i.e., a candidate computer system at which to replicate the content) is a minimum.

Since nodes in distributed system 100 can be arbitrarily disconnected, values stored on the nodes can become unavailable. In addition, since new nodes can join the distributed system at any moment, nodes that were previously closest to some keys can cease to be closest. To address these issues, the nodes constantly communicate among themselves and exchange messages about the range of values each node stores. While the nodes could exchange their complete contents with one another as part of such synchronization messages, such a scheme would not be very efficient. So, in embodiments of the invention nodes do not send their complete contents, instead they send only a hash, or sequences of hashes, of the pieces of contents they hold. In one embodiment, this may be pieces of size $\frac{1}{2}^N$ for some integer N. The hashes indicate differences only in sub-pieces of the copies of the content so only those sub-pieces need to be exchanged and not entire copies of the content. If the number of changes in contents between two nodes is small, then the differences in hashes will also be small resulting in exchanging and updating only a small amount of content that is different.

In the present invention, each piece of data has a tracker. The tracker for a given piece of data is assigned by the corresponding key for the data. If the value of a given key falls within the range of values for which a given node is responsible, then the node will keep the tracker. Further, all data is organized and split into chunks. Trackers keep complete lists of nodes holding all chunks at all times.

Chunks are stored, organized and distributed independently. Each node that receives a chunk can become a server for that chunk. Upon receiving a chunk and becoming a server, the node is recorded on the tracker. This scheme ensures read scalability since the more popular chunks will be more widely distributed and all the nodes holding them will be able to satisfy higher number of requests per given period. In contrast to BitTorrent, the present DHTFS supports writes, through DHT puts. The DHTFS synchronization scheme ensures that copies of content are always kept in a consistent state, where differences are minimized. In particular, checking of the consistency and synchronization of the content between nodes is done on every DHT put operation and may further be done periodically, according to an established time interval.

In one embodiment of the present invention, the single redundancy constant R is replaced by three constants R1, R2 and R3. These constants obey the relationship $$R1<R2<R3$$

During the consistency and synchronization check, the system ensures the following:
1. R1 nodes with IDs closest to the key of the data being put have the data.
2. At least R2 nodes have the copies of given data for all data. This ensures that there are always enough redundant trackers so no information is lost. In the present system, information can be lost only when all R2 nodes holding copies of some data leave the network between puts or synchronizations.
3. No nodes farther than R3 in the current node ID space have the data. This ensures that there are no nodes that hold the tracker for some data and are outside of K nodes returned when a find-k operation is performed on a given key. A find-k operation in Kademlia always returns K IDs closest to a given key. If there was a node holding data with a given key outside of the K closest nodes, the successive puts would not go to such a node and it could not be synchronized. The condition that no nodes farther than R3 from a given key hold the corresponding data is ensured by deleting the data from such nodes that are too far.

Because R1<R2, the system does not need to perform synchronization constantly, trying to always maintain the condition that all R2 redundant copies are always closest. This requirement is relaxed so the system tries to maintain only the condition that R1 nodes closest to a key have the corresponding data. In this scheme, R2 nodes, which do not need to be closest, must have data so there need not be synchronization if a new node with an ID farther than R1 but less than R2 from a given key joins the network. Note that in an alternative embodiment of the present invention, instead of R1<R2<R3, the three constants may be equal, i.e., R1=R2=R3, in which case the number of replicated copies is fixed.

Figure 2:
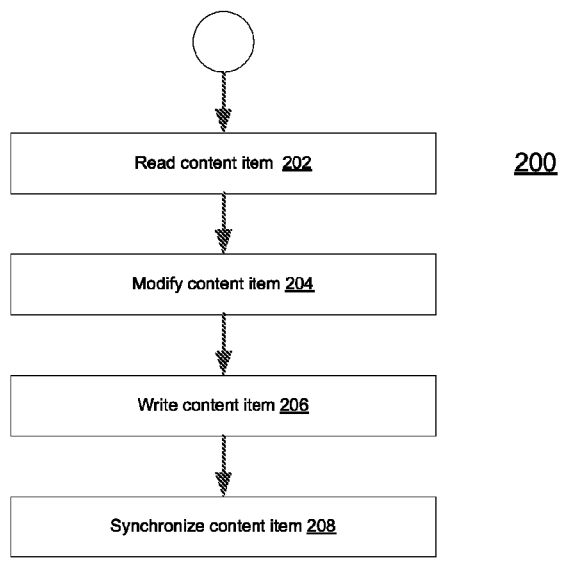
FIG. 2 illustrates an example of a process for synchronizing content across a DHTFS in accordance with an embodiment of the invention.

FIG. 2 illustrates a process 200 that exemplifies the procedure for synchronizing content across the DHTFS. At 202, a content item is read by a node of the network. The content item may be read by determining its storage location in the DHTFS using the above-described routing algorithm. The read may be accomplished using a get operation. As discussed below, the content item may be a termlist for a key word from an Internet search.

At 204, the content item is modified. This may be done in any of several ways. For example, if the content item is a document, the document may be modified in some fashion by adding or removing text, images, etc. In the case of an Internet search application, a termlist may be modified if a new Web page including a key word for which the term list exists is discovered (e.g., an instance of that. Web page is downloaded and the key word is identified, resulting in a need to update the termlist.

At 206, the modified document is written back to its storage location as determined by the DHT routing algorithm. This involves writing the document to a storage device of a computer system of the distributed system defined by a respective key. Then, at 208, the document is synchronized so that multiple instances of the document exist in the DHTFS in the even one or more nodes storing the content item become unavailable. Synchronization is accomplished by copying the document to a further R1 computer systems of the distributed system which have unique identifiers closest to a value of the respective key, where R1 is less than R2 which is less than R3, at least R2 number of the computer systems having copies of any respective document for all of the documents stored in the system, and none of the computer systems farther than R3 in an address space of the distributed system having a copy of the subject document.

In the present invention, consistency of chunks is maintained at all times. Every node periodically sends to the tracker confirmation about chunks that it holds, so that the tracker can know if the node is active and if it still contains the subject chunk. Trackers also use the confirmation of chunks in reissuing puts for all keys, to maintain consistency and redundancy. Trackers are also periodically refreshed so that inactive chunk holders are removed from tracker lists. In case there is an insufficient number of holders for a chunk, active nodes are chosen and instructed to download such chunks.

As mentioned above, the present invention can be used as a basis for implementation of various distributed applications. One such distributed application of importance is Internet search. In one embodiment, a distributed search engine can be implemented on top of the present DHTFS by using trackers to hold data for termlists for keywords—lists of pages containing the keywords. Users viewing Web pages on the Internet through their browsers are provided browser extensions that are capable of analyzing keywords on a page, with special attention given to important keywords as denoted by factors such as occurrences in titles, heading, bolded font, position in the page, etc.

Current search engines rely on crawlers to acquire and index content of Hypertext Markup Language (HTML) pages and other types of Web-based content. Crawlers have very significant limitations:
1. They are not able to access dynamic Web pages that are generated in response to Hypertext Transport Protocol (HTTP) GET and POST queries submitted by users through HTML FORM elements.
2. There are very significant restrictions in robots.txt files on Web sites on how fast crawlers are able to crawl them; in addition there are many restrictions on what pages can be crawled.
3. Due to the size of the Web, complexities of the ranking algorithms and issues related to other aspects of operation of Web-wide search engines, the information in the search indices of major search engines is updated only infrequently, typically on the order of weeks.

In accordance with embodiments of the present invention, information contained in copies of Web pages and Web histories of the pages retrieved from the Internet is used to create a distributed search index. The system builds termlists for all keywords and stores them in the DHTFS. In one embodiment, termlists are built up through puts issued upon analysis of pages viewed by users. In another embodiment, pages are obtained through distributed crawling from individual client machines.

The copies of Web pages and Web histories (as well as other information) is obtained from cached instances of the Web pages. Web caching is a well-known practice. In order to optimize response times to user requests and reduce bandwidth usage due to repeated fetching of identical content, there are numerous caches deployed throughout the Web. Examples include buffers in the Internet core and at edge routers, caches deployed by Internet service providers to better control the behavior of their networks, caches deployed by the operators of CDNs, operating system buffers on individual computers of users that hold information transmitted through Internet and many other locations. In particular, HTML pages received in response to user requests are cached by a user's browser, and such caches can grow to significant sizes.

Information obtained from Web caches and histories is superior to the information obtained through crawling in several very important respects:
1. The local Web caches and histories contain copies of dynamic pages inaccessible to crawlers because users themselves submitted the information in HTML FORM elements required to get responses; such pages are inaccessible to crawlers since crawlers have no way of knowing what information to include and submit in HTML FORM elements.
2. There are no restrictions on how fast and what Web pages can be retrieved since the pages have been fetched by users through their browsers and are not subject to limitations imposed on crawlers in robots.txt files.
3. Because users are allowed to access Web sites as often as they wish, a large enough plurality of users is capable of accessing a site much faster than a crawler even for pages which crawlers are allowed to access.
4. Information about what links users click on can be used to improve ranking and the quality of search results.

In accordance with embodiments of the present invention, for those computer systems equipped with the above-mentioned browser extensions (or other application programs configured as discussed herein), each page in a local Web cache or history is analyzed and a set of terms appearing in the page is produced for the analyzed page. For each occurrence k of a term (keyword) in the Web page p that has been analyzed, an index entry IDX(k,p) is created. Then, a put operation is issued into the DHTFS comprised of the plurality of individual user's computers in the system. An example of such a DHTFS put operation is as follows:
  put(hash(k),IDX(URL(p), TITLE(p),SUMMARY(p), PICT(p)))
where hash(k) is the hash value computed for term k; URL(p) is the URL for page p; TITLE(p) is the text of the link for page p; SUMMARY(p) is a string created by extraction of some or all of the text of the page, stripped of HTML formatting; and PICT(p) is a graphical image of the entire page or some image contained within the page that is considered as a good graphical representation of the page. Entries URL(p), SUMMARY(p), TITLE(p) and PICT(p) represent the index entry for page p in the termlist for the term k. The index entry for the page can be defined in other ways by including more, or less, of the pieces of information that should be displayed in results.

In order to address privacy concerns of users, the browser extension may be configured to indicate to a user whether it considers a subject page to be public, and therefore subject to sharing and publication within the DHTFS, or considers the page to be private and not subject to sharing. The user can be provided an opportunity to override such a determination of page status and force any page to be private and not shared, or alternately, force a page to be considered public and shared.

Queries consisting of multiple keywords frequently occur in Internet search and it is generally intended that all results should contain all of the keywords. In order to produce results for such queries, intersections of lists of results for each keyword need to be performed. One way in which to determine such an intersection is to fetch all required termlists and then intersect them. Such a process would, however, be prohibitively expensive in a distributed system in terms of the time required to fetch the termlists.

Instead, in the present invention each search result is hashed to a key. The system first sends bitmasks corresponding to small prefixes of keys for results. Such bitmasks are much smaller than complete lists of results and this way the system is able to discard all the results where there are no matches even with small prefixes since such results could not possibly match with full prefixes. It is possible to have a false positive, where prefixes match but full keys do not, but such cases are easily resolved upon fetching of full results with keys. In addition, with a sufficiently large address space for hashing, the probability of such partial matches is very low.

As should be apparent from the foregoing discussion, various embodiments of the present invention may be implemented with the aid of computer-implemented processes or methods (i.e., computer programs or routines) or on any programmable or dedicated hardware implementing digital logic. Such processes may be rendered in any computer language including, without limitation, a object oriented programming language, assembly language, markup languages, and the like, as well as object-oriented environments such as the Common Object Request Broker Architecture (CORBA), Java™ and the like, or on any programmable logic hardware like CPLD, FPGA and the like.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments of the present invention can be implemented with apparatus to perform the operations described herein. Such apparatus may be specially constructed for the required purposes, or may be appropriately programmed, or selectively activated or reconfigured by a computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

Figure 3:
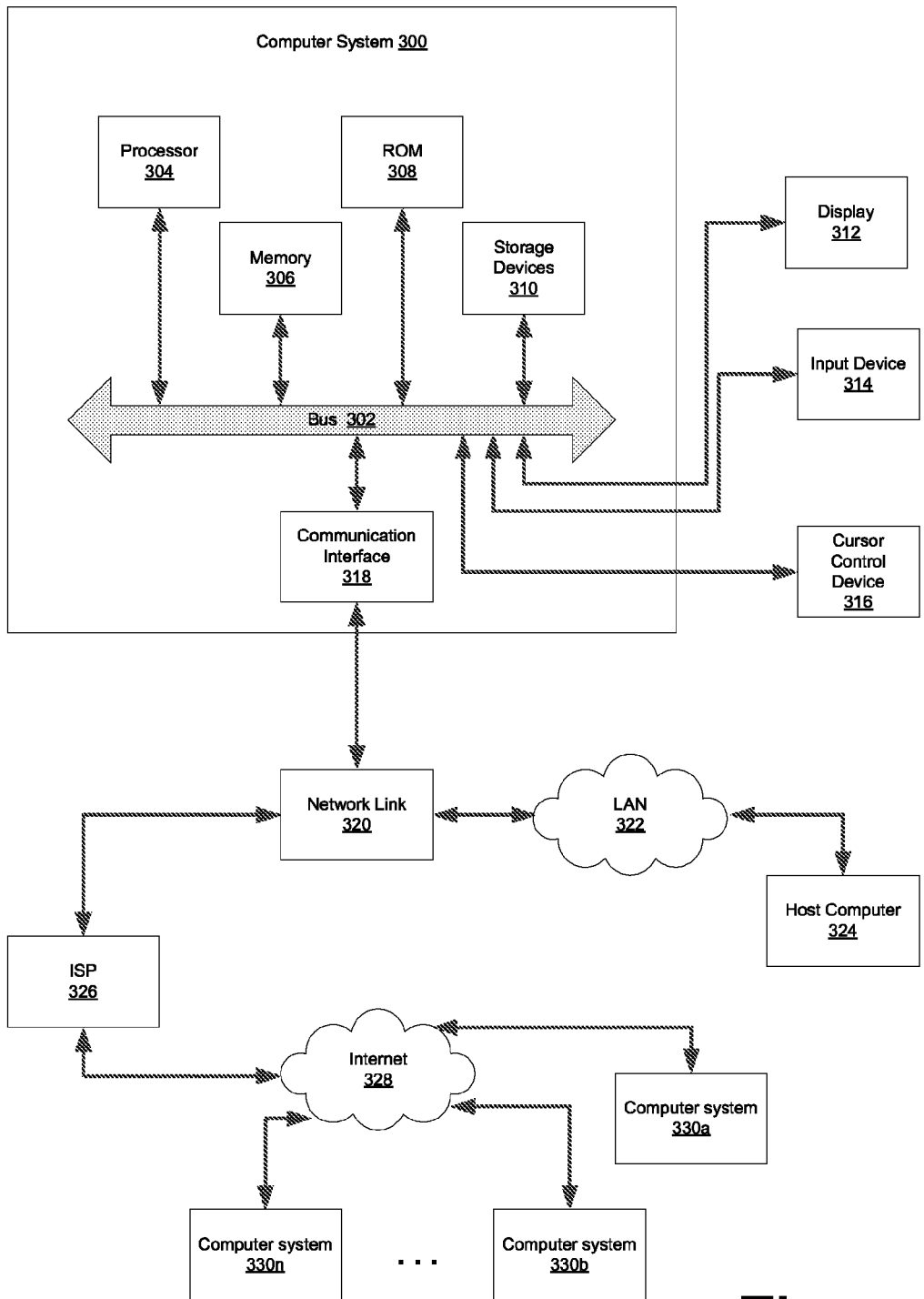
FIG. 3 illustrates an example of a computer system which may participate in a distributed system such as that shown in FIG. 1.

An example of a computer system suitable for use in accordance with these principles is shown in FIG. 3. Computer system 300, upon which an embodiment of the invention may be implemented, includes a bus 302 or other communication mechanism for communicating information, and a processor 304 coupled with the bus 302 for processing information. Computer system 300 also includes a main memory 306, such as a RAM or other dynamic storage device, coupled to the bus 302 for storing information and instructions to be executed by processor 304. Main memory 306 also may be used for storing temporary variables or other intermediate information during execution of instructions to be executed by processor 304. Computer system 300 further includes a ROM 308 or other static storage device coupled to the bus 302 for storing static information and instructions for the processor 304. A storage device 310, such as a hard disk, is provided and coupled to the bus 302 for storing information and instructions.

Computer system 300 may be coupled via the bus 302 to a display 312 for displaying information to a computer user. An input device 314, including alphanumeric and other keys, is coupled to the bus 302 for communicating information and command selections to the processor 304. Another type of user input device is cursor control device 316, such as a mouse, a trackball, or cursor direction keys for communicating direction information and command selections to processor 304 and for controlling cursor movement on the display 312.

Computer system 300 also includes a communication interface 318 coupled to the bus 302. Communication interface 308 provides for two-way, wired and/or wireless data communication to/from computer system 300, for example, via a local area network (LAN). Communication interface 318 sends and receives electrical, electromagnetic or optical signals which carry digital data streams representing various types of information. For example, two or more computer systems 300 may be networked together in a conventional manner with each using a respective communication interface 318.

Network link 320 typically provides data communication through one or more networks to other data devices. For example, network link 320 may provide a connection through LAN 322 to a host computer 324 or to data equipment operated by an Internet service provider (ISP) 326. ISP 326 in turn provides data communication services through the Internet 328, which, in turn, may provide connectivity to multiple remote computer systems 330a-330n (any or all of which may be similar to computer system 300. LAN 322 and Internet 328 both use electrical, electromagnetic or optical signals which carry digital data streams. Computer system 300 can send messages and receive data through the network(s), network link 320 and communication interface 318. Note that computer system 300 may be an example of a computer system 102a-102n from FIG. 1.

Thus, a distributed hash table-based distributed file system (DHTFS) which finds particular advantage in distributed applications has been described. Although discussed with reference to certain examples the present invention should not be limited thereby. For instance, in some embodiments of the invention a system consisting of a collection of computers connected through a local network may be used to store certain DHT items (e.g., keyword and URL trackers) not stored in the broader distributed system, thus creating a hybrid system that includes the above-described distributed system and a logically centralized collection of computers. The DHT items stored in this centralized collection of computers may be used less frequently than those which are stored in the distributed system, for example because they are associated with rare keywords that infrequently appear in queries or rare URLs which infrequently appear in ranked results. The use of such a collection of computers increases the efficiency of the overall system by using the distributed portion of the system for storing and caching frequently used keyword trackers and URL trackers.

Likewise, both the distributed system and the centralized system that includes a collection of computers connected through a network may be combined with a document partitioned system for rare and less frequently accessed documents. The more frequently accessed documents and queries may be answered by the distributed system and queries may be simultaneously submitted to the centralized portion. Such a hybrid system would increase efficiencies and the coverage of distributed system with a fixed capacity by enhancing the results from the distributed system with the results from a document partitioned, centralized system. Moreover, in a document partitioned search engine, the entire corpus of documents may be partitioned among a collection of computers, each computer being responsible for a subset of the entire corpus. Queries may be sent to all computers and results assembled for groups of results obtained from each computer responsible for a subset of the entire corpus. In still another embodiment of the invention, lists of DHTFS distributed hash identifiers stored on keyword trackers can be partitioned, with partitions stored in the DHTFS on multiple machines in a distributed fashion.

Accordingly, the present invention should be measured only in terms of the claims, which follow.

What is claimed is:

1. A system, comprising:
a plurality of computer systems communicatively coupled to one another via one or more networks and configured to form an overlay network for a distributed hash table file system, one or more of the plurality of computer systems being to:
determine, based on a distributed hash table associated with the distributed hash table file system, a key associated with a first item of content, of a plurality of items of content, to be stored via the plurality of computer systems,
determine, for the first item of content, a first value that corresponds to the key,
determine, for each of the plurality of computer systems, a second value that corresponds to an identifier of each of the plurality of computer systems,
determine, for each of the plurality of computer systems, a third value that corresponds to a difference between the first value and the second value,
identify, based on the determined third values, a first group of the plurality of computer systems, a second group of the plurality of computer systems, and a third group of the plurality of computer systems,
the third values determined for the first group being less than the third values determined for the second group, and
the third values determined for the second group being less than the third values determined for the third group,
copy the first item of content to one or more of the plurality of computer systems of the first group, and
remove copies of the first item of content from one or more of the plurality of computer systems of the third group.

2. The system of claim 1, wherein the plurality of computer systems includes N individual computer systems over which the plurality of items of content are distributed, and
one or more of the plurality of computer systems are further to:
limit accesses to the the plurality of items of content to $\log_M N$, where M is a constant.

3. The system of claim 2, wherein M is greater than 2.

4. The system of claim 1, wherein one or more of the plurality of computing systems are further to:
define the distributed hash table based on a routing algorithm that has a log(N) network diameter, where N is a number of the plurality of computer systems over which the plurality of content items are distributed.

5. The system of claim 4, wherein one or more of the plurality of computer systems are to:
assign, for each computer system, of the plurality of computer systems, the identifier of the computer system (ID) within a range $0 \leq ID < S$, where S is a size of an address space defined by a storage device of the computer system.

6. The system of claim 1, wherein one or more of the computing systems are to:
define the distributed hash table by a modified Kademlia routing algorithm in which for each sub-tree there are k nodes, where k is a redundancy factor and is not a constant.

7. The system of claim 1, wherein each content item, of the plurality of content items, is assigned a tracker according to a corresponding key for the content item, and
each respective one of the plurality computer systems stores trackers for those content items, of the plurality of content items, having a respective key within a range of values for which the respective computer system is responsible.

8. The system of claim 1, wherein the plurality of content items comprise termlists.

9. A method comprising:
determining, based on a distributed hash table associated with a distributed hash table file system, a key associated with a first item of content, of a plurality of items of content, to be stored via a plurality of network devices of the distributed hash table file system;
determining, for the first item of content, a first value that corresponds to the key;
determining, for each of the plurality of network devices, a second value that corresponds to an identifier of each of the plurality of network devices;
determining, for each network device of the plurality of network devices, a third value that corresponds to a difference between the first value and the second value;
identifying, based on the determined third values, a first group of the plurality of network devices, a second group of the plurality of network devices, and a third group of the plurality of network devices,
the third values determined for the first group being less than the third values determined for the second group, and
the third values determined for the second group being less than the third values determined for the third group;
copying the first item of content to one or more of the plurality of network devices of the first group; and removing copies of the first item of content from one or more of the plurality of network devices of the third group.

10. The method of claim 9, where the first values determined for the first group are closer to the key relative to the first values determined for the second group and the first values determined for the third group.

11. The method of claim 9, where a quantity of the plurality of network devices included in the first group is less than a quantity of the plurality of network devices included in the second group, and the quantity of the plurality of network devices included in the second group is less than a quantity of the plurality of network device included in the third group.

12. The method of claim 9, where a quantity of network devices included in the first group is the same as a quantity of nodes included in the second group and a quantity of nodes included in the third group.

13. The method of claim 9, where identifying the first group, the second group, and the third group includes:
determining that the third values determined for network devices included in the first group and the third values determined for network devices included in the second group are less than a threshold value.

14. The method of claim 9, further comprising:
defining the distributed hash table using a routing algorithm to organize the plurality of network devices into a binary tree that includes a plurality of sub-trees, each sub-tree, of the plurality of sub-trees, including k nodes, k comprising a non-constant redundancy factor.

15. A non-transitory computer-readable medium comprising:
one or more instructions that, when executed by one or more processors, cause the one or more processors to:
determine, based on a distributed hash table associated with a distributed hash table file system, a key associated with a first item of content, of a plurality of items of content, to be stored via a plurality of network devices of the distributed hash table file system,
determine, for the first item of content, a first value that corresponds to the key,
determine, for each of the plurality of network devices, a second value that corresponds to an identifier of each of the plurality of network devices,
determine, for each network device of the plurality of network devices, a third value that corresponds to a difference between the first value and the second value,
identify, based on the determined third values, a first group of the plurality of network devices, a second group of the plurality of network devices, and a third group of the plurality of network devices,
the third values determined for the first group being less than the third values determined for the second group, and
the third values determined for the second group being less than the third values determined for the third group,
copy the first item of content to one or more of the plurality of network devices of the first group, and
remove copies of the first item of content from one or more of the plurality of network devices of the third group.

16. The non-transitory computer-readable medium of claim 15, where the first values determined for the first group are closer to the key relative to the first values determined for the second group and the first values determined for the third group.

17. The non-transitory computer-readable medium of claim 15, where a quantity of the plurality of network devices included in the first group is less than a quantity of the plurality of network devices included in the second group, and the quantity of the plurality of network devices included in the second group is less than a quantity of the plurality of network devices included in the third group.

18. The non-transitory computer-readable medium of claim 15, where a quantity of the plurality of network devices included in the first group is the same as a quantity of the plurality of network devices included in the second group and a quantity of the plurality of network devices included in the third group.

19. The non-transitory computer-readable medium of claim 15, where the one or more instructions to identify the first group, the second group, and the third group include:
one or more instructions that, when executed by the one or more processors, cause the one or more processors to:
determine that the third values determined for network devices included in the first group and the third values determined for network devices included in the second group are less than a threshold value.

20. The non-transitory computer-readable medium of claim 15, further comprising:
one or more instructions that, when executed by the one or more processors, cause the one or more processors to:
define the distributed hash table using a routing algorithm to organize the plurality of network devices into a binary tree that includes a plurality of sub-trees, each sub-tree, of the plurality of sub-trees, including k nodes, k comprising a non-constant redundancy factor.

* * * * *